(12) United States Patent
Wilkins et al.

(10) Patent No.: US 7,136,880 B2
(45) Date of Patent: Nov. 14, 2006

(54) METHOD AND APPARATUS FOR COMPILING BUSINESS DATA

(75) Inventors: Jeffrey K. Wilkins, Austin, TX (US); Prashant P. Devdhar, Cupertino, CA (US)

(73) Assignee: Market Models, Inc., Wickford, RI (US)

( * ) Notice: Subject to any disclaimer, the term of this patent is extended or adjusted under 35 U.S.C. 154(b) by 238 days.

(21) Appl. No.: 09/910,471

(22) Filed: Jul. 20, 2001

(65) Prior Publication Data

US 2002/0099561 A1 Jul. 25, 2002

Related U.S. Application Data

(60) Provisional application No. 60/219,751, filed on Jul. 20, 2000.

(51) Int. Cl.
*G06F 17/30* (2006.01)
(52) U.S. Cl. .................... 707/203; 703/3; 703/104.1; 705/1
(58) Field of Classification Search ............ 705/1, 705/7, 8, 26; 707/1, 3, 6, 7, 100, 102, 8, 707/203; 715/513; 711/111, 4
See application file for complete search history.

(56) References Cited

U.S. PATENT DOCUMENTS

| | | | | |
|---|---|---|---|---|
| 5,590,320 | A * | 12/1996 | Maxey ................... | 707/203 |
| 5,598,557 | A * | 1/1997 | Doner et al. ............ | 707/5 |
| 5,848,410 | A * | 12/1998 | Walls et al. ............ | 707/3 |
| 5,924,094 | A * | 7/1999 | Sutter .................... | 707/10 |
| 6,003,046 | A | 12/1999 | Nielsen ................. | 707/513 |
| 6,064,979 | A | 5/2000 | Perkowski ............. | 705/26 |
| 6,065,001 | A * | 5/2000 | Ohkubo et al. ........ | 707/3 |
| 6,247,013 | B1 | 6/2001 | Morimoto ............... | 707/10 |
| 6,289,342 | B1 * | 9/2001 | Lawrence et al. ...... | 707/3 |
| 6,338,067 | B1 * | 1/2002 | Baker et al. ........... | 707/100 |
| 6,366,947 | B1 * | 4/2002 | Kavner ................. | 709/203 |
| 6,460,060 | B1 * | 10/2002 | Maddalozzo, Jr. et al. . | 707/513 |

(Continued)

FOREIGN PATENT DOCUMENTS

EP 0 924 628 * 6/1999

(Continued)

OTHER PUBLICATIONS

Chen Si-Qing et al.: Grammar-debugger: a parser for Chinese EFL learners; Institution of Electrical Engineers; 1990; INSPEC Astract No.: C91032149; Dialog File 2: INSPEC.*

*Primary Examiner*—Igor N. Borissov
(74) *Attorney, Agent, or Firm*—Lumen Intellectual Property Services, Inc.

(57) ABSTRACT

The present invention provides a method and apparatus of compiling and providing business data in a distributed computer system, preferably the Internet or any other type of computer linked network system. The present invention also provides a computer program product that contains business data compiled from files containing business data located in a distributed computer system. The present invention to provide a cost-effective method for automatically compiling a business data as well as an automated method for refreshing business data so as to keep it current. The advantage of the present invention is that it enables one to compile business data from files in a distributed computer system in a cost effective and time effective manner taking advantage of the large number of data that is available in a distributed computer system. Another advantage is that the present invention enables one to quickly update business data to stay current.

29 Claims, 2 Drawing Sheets

U.S. PATENT DOCUMENTS

| | | | |
|---|---|---|---|
| 6,519,763 B1 * | 2/2003 | Kaufer et al. | 717/101 |
| 6,553,385 B1 * | 4/2003 | Johnson et al. | 707/104.1 |
| 6,556,983 B1 * | 4/2003 | Altschuler et al. | 706/55 |
| 6,560,606 B1 * | 5/2003 | Young | 707/100 |
| 6,665,836 B1 * | 12/2003 | Wynblatt et al. | 715/501.1 |
| 6,675,356 B1 * | 1/2004 | Adler et al. | 715/530 |
| 6,728,762 B1 * | 4/2004 | Estrada et al. | 709/218 |
| 2002/0091661 A1 * | 7/2002 | Anick et al. | 707/1 |

FOREIGN PATENT DOCUMENTS

| | | | |
|---|---|---|---|
| WO | WO 99/50759 | * | 10/1999 |
| WO | WO 99/59087 | * | 11/1999 |

* cited by examiner

METHOD AND APPARATUS FOR COMPILING BUSINESS DATA

CROSS-REFERENCE TO RELATED APPLICATIONS

This application is cross-referenced to and claims priority from U.S. Provisional application No. 60/219,751 filed Jul. 20$^{th}$, 2000, which is hereby incorporated by reference.

FIELD OF THE INVENTION

The present invention relates generally to computer systems. More particularly, the present invention relates to an Internet-based system for identifying and compiling potential business data based on Internet-accessible data.

BACKGROUND

According to the Direct Marketing Association, around $100 billion was spent on US business-to-business direct marketing at the beginning of the new millennium. Of this total, telemarketing accounts for about 40%, and direct mail expenditures total about 16%. Business marketers typically target prospects within a business based on their ability to recommend, influence or approve a purchase. Commonly, the marketer obtains, for example, a list of the name, title, postal address, and/or telephone numbers of these prospective buyers so that direct marketing programs can be initiated.

Further elaborating on this example, typically, a prospect must have the ability, willingness, and readiness to buy before a direct sate can be consummated. One method is to identify individuals with certain titles (e.g. CEO, VP Marketing) that are likely to correlate with purchasing authority. Vendors, such as Dun & Bradstreet, Murray 011, NJ and InfoUSA, Omaha, Nebr., gather business data through a variety of means. For example, the sources for InfoBase Business List (Acxiom Corporation, Little Rock, Ark. www.acxiom.com) include:

Annual reports, 10Ks, and other SEC information. These sources provide accurate, in-depth information about publicly traded companies including the name of executives and directors, employment figures, sales volume, and more.

Federal, state and municipal government filings. These sources provide current directories, reports, and Chamber of Commerce information.

Business magazines, newsletters and newspapers. These sources provide news about business merger, acquisitions, executive changes and financial results.

Outbound telemarketing. These sources provide information about small businesses and their owners obtained from firms who frequently market to these businesses.

Professional directories. These sources provide invaluable information about professionals, their clinics and partnerships, and their specialties.

Leveraging these sources, the InfoBase business list provides over 14 million business names and addresses representing over 12.9 million separate businesses.

There are several limitations in utilizing these sources for compiling, for instance, a list of senior managers. The limitations include:

Recency. American society has been characterized by shorter tenures of employment and greater job mobility. But many of the sources used to compile lists of senior managers are updated infrequently. In some instances, data is refreshed only once every 1–2 years. This means that changes in senior management, such as new hires and terminations, go unreported for a significant time.

Cost. Because it is so labor intensive, it is often prohibitively expensive to conduct telephone or face-to-face interviews, or verify contact information 'on demand'.

Comprehensiveness. Often, only a small number of contacts are gathered at each business. For example, Acxiom's list contains an average of 1.17 contacts per company (14 million contact names at 12 million US businesses). What's more, contact data for non-US companies is even scarcer.

Accordingly, there is a need to develop a more useful and efficient approach to compile business data that overcomes the limitations in the prior art solutions.

SUMMARY OF THE INVENTION

The present invention provides a method and apparatus of compiling and providing business data in a distributed computer system, preferably the Internet or any other type of computer linked network system. The present invention also provides a computer program product that contains business data compiled from files containing business data located in a distributed computer system. The product according to the present invention could be stored in any type of computer readable medium that stores business data. The present invention includes locating files or links in a distributed computer system that contain business data. Once the files or links have been identified and selected, each file or link is parsed to extract the business data of interest. After the business data of interest is extracted, the extracted business data could be transferred to an interested party. The present invention also includes different ways of evaluating the files or links that contain potential business data. The evaluation includes the determination of a confidence level of finding the business data. However, the evaluation also includes the determination of a confidence level of finding a subset of the business data. In addition, the evaluation includes the use of keywords in the file or link to determine a confidence level of finding the business data. The files or links are usually located on, but not limited to, corporate, magazine, newspaper, press release, professional, and association websites. The location of files or links is accomplished by different ways, such as, but not limited to, using a publicly accessible search engine, using a general purpose or custom defined spider, or by selecting one or more links in the computer distributed system wherein the links are selected based on their proximity to a set of keywords. The location of the files or links could also be established by using a list that defines the files or links based on a previously generated list of the files. The present invention further includes the step of evaluating a tense, for instance a past or a future tense, related to the business data. Furthermore, once the tense is identified the present invention determines whether or not to include or discard the business data that is associated with that particular tense. The present invention provides mechanisms to use one or more tags to locate the files or links that contain business data. In addition, the present invention provides mechanisms to use one or more tags to extract the business data. Furthermore, the present invention includes the step of creating a concordance table to facilitate the extraction of the business data. For instance, in the concordance table one or more tag counts are associated with the business data. In addition, the present invention includes a mechanism to rate and bound the local content group that contain the business data of interest. The present invention also provides an analysis that uses inclusion and exclusion characteristics to extract the business data. The present invention further includes the step of normalizing the business data. Eventually, the present invention also enables one to eliminate duplicate sets of business data. In order to keep the extracted business data current, the present invention includes the step of extracting date or time stamps of the files that contain the business data. In the updating process, the date or time stamps are compared with the date or time stamps in the previously extracted business data or in the located files themselves. Date or time stamps are also used to identify particular business data before extraction.

In view of that which is stated above, it is the objective of the present invention to provide a cost-effective method for automatically compiling a list of large numbers of business data.

It is another objective of the present invention to provide an automated method for refreshing business data so as to keep it current.

It is yet another objective of the present invention to provide a method that takes advantage of the large amounts of business data that is available on the Internet and that is constantly updated.

It is still another objective of the present invention to provide a method and apparatus for generating lists of business data that is highly scalable, both in the number and their geographic distribution.

The advantage of the present invention over the prior art is that the system enables one to compile business data from files in a distributed computer system in a cost effective and time effective manner taking advantage of the large number of data that is available in a distributed computer system on the Internet. Another advantage is that the present invention enables one to quickly update business data to stay current.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention provides a method of providing business data in a distributed computer system, preferably the Internet or other types of computer linked network systems. The present invention is used to identify and compile business data that relates to any type of business data that is entertained in a business and/or businesses. The present invention does include any type of business data whether it is from a non-profit, for-profit or government organization. An example of the scope of the present invention is, for instance, to identify websites conducting e-commerce. For this particular application one would use the presence of shopping carts, check-out pages, credit card order forms, secure server https, etc. on various websites as an indicator to identify and compile business data. Another example of the scope of the present invention is extracting corporate contact information (postal address, telephone number, fax number) from websites. Naturally, this is useful to pair with the names of senior executives that one could extract to generate complete direct mail or telemarketing records. For this particular example, it also helps to tie the domain name of online businesses to business marketing databases such as D&B or infoUSA. It can also help identify 'corporate linkages' between offices or subsidiaries of the same company. Yet another example of the scope of the present invention is compiling e-mail lists by extracting the name and e-mail address of employees. As one skilled in the art would readily acknowledge, the present invention could compile any type of data from a computer distributed system and is not restricted to these examples.

The following provides an exemplary embodiment wherein the present invention is used to identify contact information for large numbers of senior managers in a cost effective manner. Contact information in this example encompasses name and job title, but in some instances also includes postal address, telephone number, email address or fax number. The present invention relies on the wealth of continuously updated business data available on the Internet that can be mined to identify contact information for senior managers. Once identified, the contact information can be extracted and enhanced with direct marketing databases to allow further targeting.

The method of the present invention leverages business data from an employer's own corporate website, as well as third party sites. However, the present invention is not limited to any source in the computer distributed system that contains any relevant files that contain business data.

Corporate Websites. According to Internet registrar Network Solutions, approximately 14 million domain names were registered as of Mar. 31, 2000, an increase of 233% from the 4.2 million registered as of Mar. 31, 1999. It is estimated that fully 3.6 million or 26% are used by US businesses as their primary corporate website.

A corporation's own website is a prime information source for identifying the names, job titles, and other contact information for its senior managers. For example, many company websites contain a webpage listing the top 5–10 senior executives. The page minimally contains the name and job title of the managers. Sometimes this information is augmented with a bio of the manager, their email address, phone number, fax number or postal address.

For example, on Jul. 10, 2000, the website for Lowell General Hospital, Lowell, Mass. listed members of senior management. In the following example below, each manager's name was hyperlinked (indicated by an underline) to a detailed biography.

Senior Management at Lowell General

Management Profiles

Robert A. Donovan

President and Chief Executive Officer

Normand E. Deschene

Executive Vice President and Chief Operating

Officer

Nicholas J. Arloro

Senior Vice President, Finance Treasurer

M. Patricia Crane

Vice President, External Affairs

Gail LaBrecque

Vice President, Operations Chief Nursing Officer

Wayne E. Pasanen, M.D.

Vice President, Medical Affairs

Ellen Caille

Vice President, Operations

Lowell General Hospital, 295 Vamum Avenue, Lowell, Mass. 01854 Main Telephone: (978)937-6000

The management page in the example above is a particularly good source of fresh data since corporations maintain the info and have a strong incentive to update the page when new managers are hired or employment is terminated. In addition, once a 'map' detailing the location of this page has been built, it is easy to check whether it has been updated on demand.

In some cases, a management contact page is not provided. In these instances, other portions of the corporate website may be mined such as a listing of press releases.

Corporate websites are an excellent source of press releases, since many of these releases are not distributed to wire services or appear elsewhere on the web (see 'Third Party Sites' below). In these instances, press releases can be mined only from the corporate site. Press releases are commonly found on pages with names like 'Press', 'News' or the like. Beyond the name of the web pages, a press release can usually be identified by its structure. For example, the body of a press release starts with the city and date of the release as indicated in the example below. The body of the press release commonly ends with a standard boilerplate description of the firm. Press releases often quote senior executives from one or more organizations. Once identified, the name and title of the executive can be easily parsed.

For example, Buck & Pulleyn, a Rochester, N.Y. marketing communications firm, announced the signing of Veramark as a new client in a press release (http://www.pulleyn.com/Press/veramark(veramark.htm). In this particular example, which is provided below, Dan Foster, president and COO, Buck & Pulleyn, can be identified as a senior manager of the firm as of Jun. 6, 2000.

Veramark Selects Buck & Pulleyn for Public Relations and Collateral Design Services ROCHESTER, N.Y., Jun. 6, 2000—Veramark® Technologies, Inc. [NASDAQ: VERA], an international developer of Internet resource management and enterprise telemanagement products, has selected Buck & Pulleyn, Inc. to perform marketing communications planning, public relations, and sales collateral design services on its behalf. These activities will initially focus on VeraWeb, a new Internet accounting and resource management product. Anticipated billings were not disclosed.

"Veramark complements our growing base of telecommunications and IT clients, including N-Soft and Corning Semiconductor Materials," said Dan Foster, president and COO, Buck & Pulleyn. "While the agency is expanding to serve technology clients throughout the U.S. and overseas, it's always a pleasure to work with a locally-based company."

Headquartered in Pittsford, N.Y., Veramark Technologies, Inc. is engaged in the design, production, and servicing of Internet, communications management, and billing systems for users and providers of network services worldwide. For additional information, visit www.veramark.com.

Founded in 1982, Buck & Pulleyn—a full service marketing communications firm based in Rochester, N.Y.—is a partner in the WORLDCOM Public Relations Group and a member of the American Association of Advertising Agencies. Its clients include Eastman Kodak Company, Xerox Corporation, Corning Inc., N-Soft S.A., National Industries for the Blind, Harris Interactive, and eBidenergy.com.

For more information, call (716) 288-6900.

Third Party Websites. In some cases, a company will not have a corporate website, or the website may not list senior executives or provide press releases. In these instances, third party websites may be useful. Many sources are web-accessible, including magazine and newspaper sites, press release wire service websites, or professional/trade association websites.

Magazines/Newspapers. More than 1,000 US newspapers are now Internet-accessible. Many are general interest daily newspapers, which include business sections containing both local and national news. Business data/contact information can also be found online in 'local' business newspapers (e.g. Austin Business Journal, Austin, Tex.), national business publications (e.g. Businessweek) and trade magazines (e.g. EE Times) are also online. In some cases, this data can be accessed through aggregator websites which allow full-text searching of numerous sources. For example, Infonautics eLibrary provides access to more than 7.5 million articles from more than 150 full-text newspapers, hundreds of magazines, two international newswires, and more. Bizjournals.com provides a searchable archive of its 41 local city business journals. In some instances, data must be accessed from an individual site. The site may provide a search engine for its own site, or a third party indexer/search engine such as Google or AltaVista may be used.

Press Release Wire Services. Press releases can also be found at wire service website companies such as BusinessWire (www.bizwire.com), PlGewswire or financial portals like Yahoo!Finance On Jul. $10^{th}$, 2000, hyperlinks to the full text of numerous releases were listed, including those shown in the following example.

Business Wire-Monday Jul. 10, 2000

(all times are Eastern)

General Magic Appoints Paula E. Skokowski to Vice President of Marketing—9:04 am FiberChem Reports Successful E-Warrant Redemption—9:04 am eProNet Partners With the Forum for Women Entrepreneurs to Provide FWE Members Access to Top-Tier Job Candidates—9:04 am Accelerated Networks Joins Siemens to Demonstrate Multiservice Broadband Wireless Solution at WCA 2000—9:04 am Prodeo Technologies Announces New Pre-Owned Equipment Division. Prodeo XS—9:03 am Sensormatic Announces Change in CFO Position—9:03 am Road Runner Chooses BroadJump to Cut Time and Expense of Broadband Subscriber Support—9:03 am Mexico Must Resolve Issues for Top Investment Rating. Says Dupont COO In Energy Houston—9:03 am Percussion Software Sets Its Sights On the XML Content Management Market—9:03 am At Mid-Year, DVD-Video On Target to Beat Earlier Projections—9:02 am ADVISORY/Leading Registrar Namesecure to Provide Daily Notes and Commentaries From Japan ICANN Conference At www.namesecure.com—9:02 am I-Network.com Expands Sales Force to Meet Growing Demand for Services—9:02 am Alcoa's Earnings Up 57% From Year-Ago Quarter On a 38% Increase in Revenues—9:02 am Gulistan Carpet Covers Supply Chain Needs With Adexa—9:01 am Professional/Trade Associations. Senior executives may be listed on trade/professional association websites. For example, as of Jul. 10, 2000, the corporate website for the Auburn Regional Medical Center, Auburn, Wash. did not list any senior hospital administrators. But the names and titles of several executives were listed on the website of the Washington State Hospital Association An extract of the listing for ARMO is shown below and lists the CEO, COO and business development administrator for the medical center.

Auburn Regional Medical Center
www.armcuhs.com
Plaza One, 202 N. Division Street—Zip 98001-4908
Michael M. Gherardini, Chief Executive Officer and Managing Director, 333-2501
Pat Bailey, Assistant Admin., Business Development, 333-2528
D. Blain Claypool, Chief Operating Officer, 804-2860
General Hospital, 149 beds
Owned by Universal Health Services, Inc.
FAX: (253)939-2376 (253)833-7711

Figure 1:
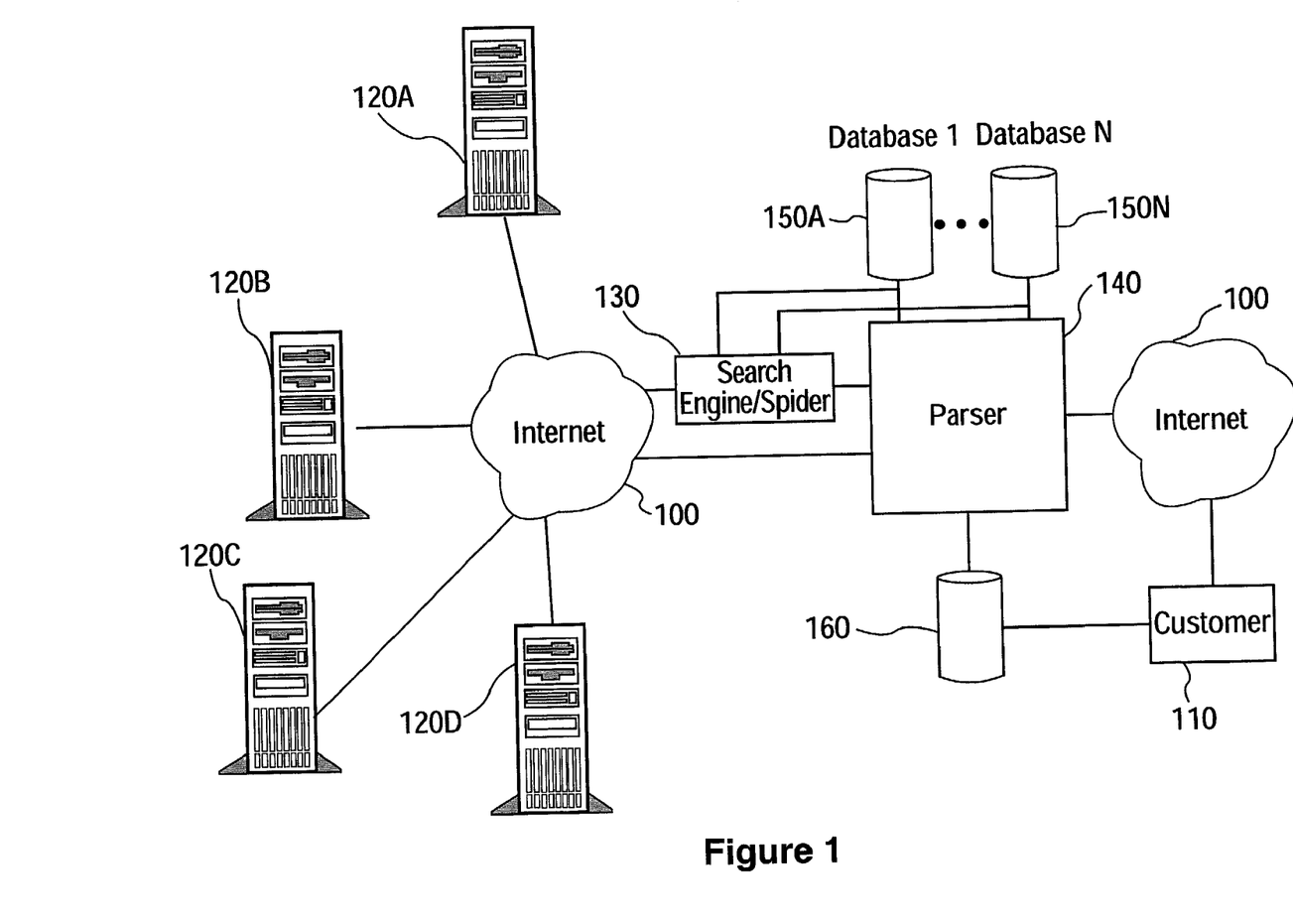
FIG. 1 shows an illustrative diagram of a method according to the present invention.

A preferred embodiment of the present invention is shown in FIG. 1. While the present invention may occur within any distributed computer system, the Internet 100 is preferable, because it provides a common platform to access thousands of sources of business data. In particular, Internet 100 provides access to continuously updated business data found on both a company's own site and third party websites. Within Internet 100 are files or documents containing potential business data, indicated by 120A, 120B, 120C and 120D, from for instance corporate websites and third party sources such as press release wire services, newspaper/magazines and professional/trade associations, that contain the name and titles of millions of senior managers in case of the example of compiling a list of senior manager. Sometimes additional contact information such as email address, telephone number or postal address is also included. The present invention is not limited to the type of business data to be extracted or mined.

In FIG. 1, Search Engine and/or Spider 130 refers to both i) a specially-developed spider to access information behind a CGI script, accessible only by entering a search string into a text bar or clicking a search button and ii) a publicly-accessible search engine such as Google or Altavista which indexes a substantial portion of the web that is accessible through hyperlinks. Searches could be constructed using data from the databases 150A . . . 150N. Examples of such databases 150A . . . 150N in the context of compiling contact information are, for instance, but not limited to, an organization, job title, and contact database. The organization database contains, for instance, fields for the organization's name, postal address, industry/SIC, third party identifiers (e.g. DUNS #) and primary corporate domain name. However, it is not necessary for all data elements to be available for all records in the organization database. This data is collected by various business data providers, such as MarketModels, Warwick, R.I., which sells a product called eBizFile. The present invention distinguishes general purpose spiders 130 that identify files on, for instance, a site like Yahoo as well as custom build spiders 130 that are content specific and search for content specific information.

A job title database contains, for instance, but is not limited to, common job titles for senior managers of various kinds of organizations. U.S. for-profit corporations (.com or .biz would commonly use titles such as CEO, Chief Executive Officer, Chairman, Vice President of Marketing, and so on. U.S. universities (.edu) would commonly use titles such as chancellor, provost, dean, professor, and so forth. U.S. non-profit organizations (.org) might use titles such as executive director or managing director. The present invention is not limited to the U.S. and other files or links could be used with different extensions, such as .nl or .uk for websites originating in The Netherlands or the United Kingdom respectively.

A contact database contains previously mined records for senior managers. It contains for instance, but is not limited to, fields for the manager's name, title, company identifier such as DUNS #, manager's postal address, email address, and telephone number, the URL containing the mined information, the date URL was mined, and the date the URL was last updated. A contact database can be partially seeded with existing data from traditional suppliers, such as a manager's name and title.

Databases 150A . . . 150N could be used to form queries to identify the URL containing the desired business data. First, an attempt is made to identify the business data, or in the particular example, contact information within the corporate website. The present invention utilizes different types of information to identify the proper links. Examples of the type of information, in line with the current example, are for instance, but not limited to, corp, corporate, company, team, management, overview, leadership, leaders, staff, exec, executive, bios, biograph, professional, people and profile. The present invention searches also for links based on their proximity on a set of keywords. Examples of such keywords are, for instance, but not limited to, about us, about, analyst info, company, background, contact, us, corporate, officer, executive, management, or combinations of these keywords or the like.

According to the present example, the corporate website is searched to identify a 'management' contact page. This is done by searching for a job title appropriate for the organization, and constraining the search to pages within the corporate site. For example, when trying to find contacts at ABC Corporation, one could use a common title at a for-profit company in combination with the primary domain name of the company. One could also exclude sites with hyperlinks to the abc.com website. Using the AltaVista search engine, the query would be:

("Chief executive officer") AND (host:abc.com)

A further refinement would use existing contact information, such as the name of a known contact to help identify the right page. If Joe Smith is the Vice President of Marketing, at ABC Corporation and the goal is to discover the CEO, the query might be refined to be:

"chief executive officer" AND (Smith NEAR Marketing) AND (host:abc.com)

The goal of the effort is to identify a candidate management page on the company's website and then further parse the page or file to extract and compile business data.

As shown in FIG. 1, the text of the candidate page is passed to parser 140. Parser 140 attempts to identify, normalize and extract business data, or in the particular example contact information. Parser 140 must be able to extract information in a variety of words and formats. For example, the same title may abbreviated in multiple ways, such as VP or V.P. for Vice President. Numerous other abbreviations are used in listings of senior managers including sr, exec, dir and so on. Email addresses may be explicitly provided or provided through a 'mail-to' hyperlink. Telephone numbers may be listed with different formats, such as the full direct dial number, a general company number with an extension or just an extension. Parser 140 translates this semi-structured information into a structured format. Once the title has been extracted and normalized, an attempt is made to find a proper name near (usually immediately preceding) the title. In some cases, for example, the name associated with the title may appear after the title or below or above the title in a webpage. In such cases, for example, the parser 140 first makes a determination of a local content grouping near the title that is associated with that title by using tags and keywords as boundary markers. Once a local content grouping near the title is identified, identification and extraction of a name, for example, can take place only in the local content grouping. Parser 140 matches candidate given and surnames to, for instance, a proper name database, which is, for instance, a database out of the series of databases 150A . . . 150N. In cases where a name does not match any name in a proper name database, certain characteristics of names, for example, can be used to detect and extract names. Such characteristics that define names ('inclusive characteristics') or characteristics to discount off names ('exclusion characteristics'), for instance, are used to extract the words that are names and to discount the ones that are not. Such inclusion characteristics for a name, for instance, could include capitalized first letters, consonant and vowel placements and such. The exclusion characteristics, for instance, but are not limited to, could include presence of apostrophes, or multiple non-simultaneous capitalized letters, length characteristics and such. The inclusion characteristics for an email address, for example, but not limited to, could be presence of the '@' sign and the presence of the internet address in the dot-notation format. Additional inclusion characteristics could include the requirement that the top-level domain name be from a specific list of top-level domain names. Exclusion characteristics for discounting words that are not email addresses for example could be absence of an '@' sign, or the presence of a '-' (dash) etc. Once name and title are extracted, a score is computed regarding the confidence level of the extraction. Presumably, an extraction in which both the job title is found in the job title database, and the name is found in the proper name would score highly. Conversely, an extraction in which the job title did not match the job title database, but the extracted name matched the proper name database, would score lower.

If the contact information has been successfully parsed, the URL for the page with the highest score (e.g. in the example provided above for the website for Lowell General Hospital, Lowell, Mass.) may be added to the manager(s) record in contact database. The URL may be used to directly access the contact information on subsequent updates. When reaccessed, the date or time stamp on the page is compared to the last mining date. If the page has been updated since the last mining, contact parsing is repeated.

The preceding contact parser references databases of 'allowable' job title and proper names to extract semi-structured information from HTML webpages. Contact parsing would be considerably simplified should a more formal page markup language, such as XML, come in to widespread use. XML allows text on websites to be tagged to, among other advantages, allow easier information extraction.

XML is a markup language for documents containing structured information. Structured information contains both content (words, pictures, etc.) and some indication of what role that content plays (for example, content in a section heading has a different meaning from content in a footnote, which means something different than content in a figure caption or content in a database table, etc.). Almost all documents have some structure. A markup language is a mechanism to identify structures in a document. The XML specification defines a standard way to add markup to documents.

In HTML, both the tag semantics and the tag set are fixed. An <h1> is always a first level heading and the tag <ati.product.code> is meaningless. The W3C, in conjunction with browser vendors and the WWW community, is constantly working to extend the definition of HTML to allow new tags to keep pace with changing technology and to bring variations in presentation (stylesheets) to the Web. However, these changes are always rigidly confined by what the browser vendors have implemented and by the fact that backward compatibility is paramount. And for people who want to disseminate information widely, features supported by only the latest releases of Netscape and Internet Explorer are not useful.

XML specifies neither semantics nor a tag set. In fact XML is really a meta-language for describing markup languages. In other words, XML provides a facility to define tags and the structural relationships between them. Since there's no predefined tag set, there can't be any preconceived semantics. All of the semantics of an XML document will either be defined by the applications that process them or by stylesheets.

Referring again to FIG. 1, updated business data 160 or contact information is transferred as a computer product to an interested party or customer 110, preferably using the Internet 100. For example, contact information 160 may be transferred by ftp or email, or they may be located at a secure web site accessed only by those given permission. The interested party 110 may be an end-user (such as the sales & marketing department of a corporation) or a value-added remarketer (e.g. business data vendors such as Acxiom, infoUSA or Dun & Bradstreet). In addition, customer 110 receives a computer program product as a result of the method of the present invention. The computer program product has stored business data compiled from files located in a distributed computer system. The storage can be in any type of computer readable medium such as, but is not limited to, recordable type media such as floppy disks and CD-ROMS and transmission type media such as digital and analog communication links.

Business data 160, or contact information in the particular example, that is transferred to interested party 110 may contain varying amounts of information. For example, it may contain only contact name and title, or it may also include auxiliary contact data (postal address, email address or telephone number), third party identifiers (such as DUNS #'s) and time stamps (date of the mining or file creation date of any contact information).

Figure 2:
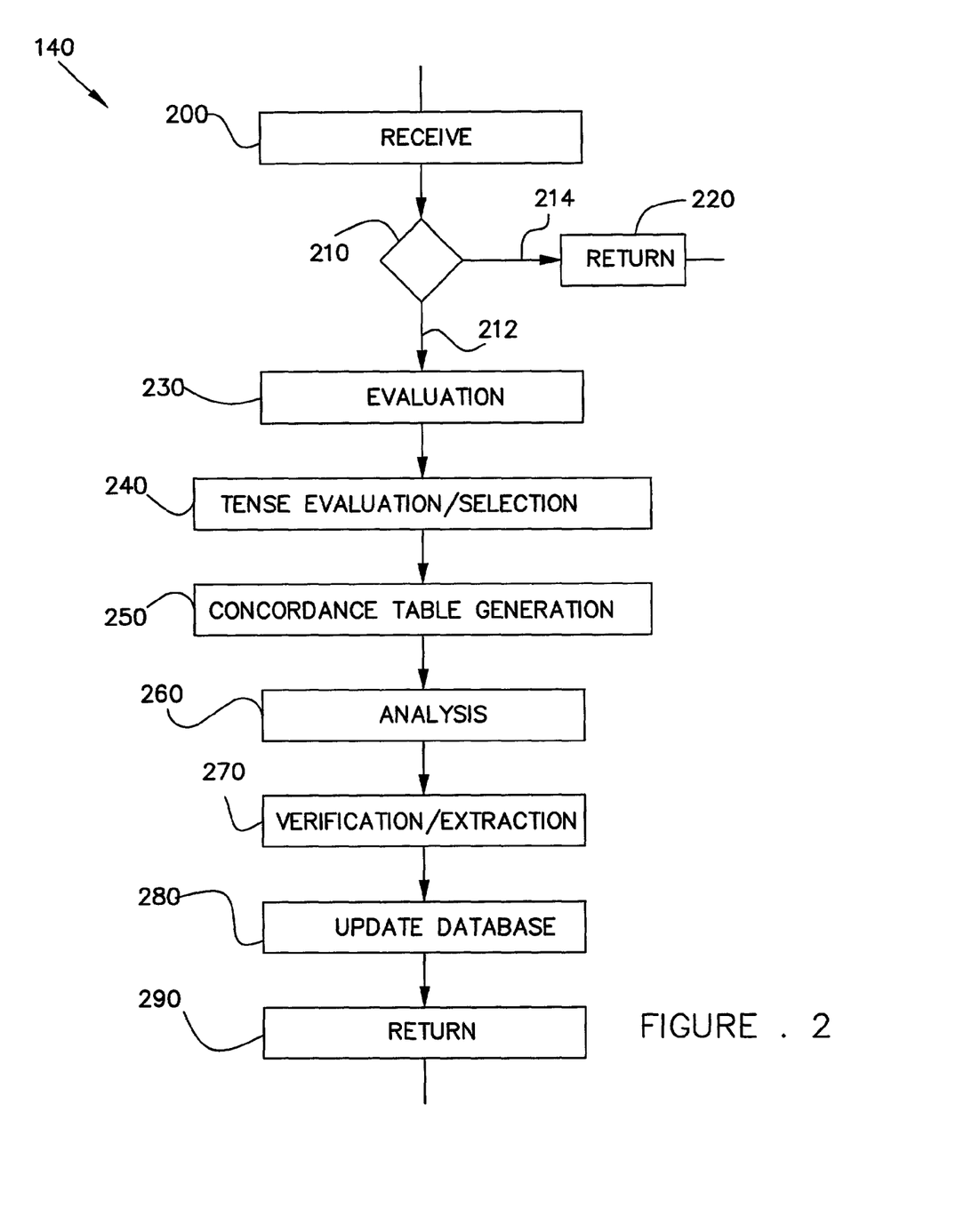
FIG. 2 shows an exemplary flowchart of steps for processing files or links that contain business data according to the present invention.

Now addressing FIG. 2 in combination with FIG. 1, FIG. 2 shows different steps involved in processing or parsing 140 the potential business data according to the present invention. Once the files or links have been identified in search 130, each file or link is then parsed 140. Once files or links have been identified a list is generated that contains the previously generated files or links for future use in parsing 140. In parsing 140, each file is received 200 and one or more checks 210 are performed. Checks 210 are, for instance, checks whether the file or link is still available or whether the file or link has moved to a different location. In case the file or link has moved and the new location is provided, the database that contains a list of links or files is updated. Various different checks 210 could be performed to ensure the integrity of the files or links before proceeding 212 on the actual processing/parsing in 140. Once a file or link has not been approved 214 the program returns 220 to the main program. Upon acceptance of the file or link an evaluation 230 is performed. Evaluation 230 determines a confidence level of the business data in the file or link. The objective of evaluation 230 is to determine the likelihood of finding business data and/or the quantity of business data in that file or link to determine if this file or link is worthwhile to pursue. Evaluation 230 is done on either a subset of the type of business data under investigation or on the entire set of business data. The present invention also includes the determination of a confidence level of finding a set of keywords in the files or links that contain business data. Different keywords can be used that quickly identify the type of business data available in the files or links. Once a certain threshold is achieved in the evaluation step, the program continues. Otherwise the program proceeds with the next file or link in the list to be parsed.

The present invention also includes the step of evaluating a tense 240, for instance past or future tense, of the data that is identified. In the example of senior management data it is pertinent that the information be current. In that case, a past tense evaluation is performed 240 to check on past tense relationship of the business data and/or keywords. Once the past tense relationships are identified, they will be discarded. In another example, it might be important to only select on past tense when a customer 110 wants to get a history on certain events related to their business or marketing.

The present invention also includes the step of using one or more tags to identify or extract business data. For instance, but not limited to, tags like <TR>, <TD>, <Title>, <BR>, <P>, or <B>could be used to identify keywords and/or business data or to establish boundaries of local content grouping to facilitate extracting business data. The present invention is not restricted to the type of tags or equivalent structures in a file or link that can be identified or associated to potential business data. Any other type of system or coded semantics could be used.

Using one or more tags, the present invention also includes the step of generating a concordance table 250. The purpose of table 250 is to associate the business data under consideration and/or keywords with a number or another type of rating system so that the information can be rated and bounded. The rating process is, for instance, but not limited to, the process of going word by word through a file or link and adding to a number of counts when certain keywords and/or tags that are found. An example is, for instance, but not limited to, data containing chairman, CEO, VP etc. that established a count of, for instance, 19, 15, and 12 respectively depending on whether the proper tags and keywords are identified. Each word in the file also, for instance, has a tag and keyword count set associated with it. An example is, for instance, but not limited to, <P> Joe Smith <BR> Chairman and CEO <BR> ABC Corporation <BR> <BR>John Doe <BR> President <P>, that established a set of 1 <UP> tag and 0 <BR> tags for words Joe and Smith, a set of 1 <UP> tag and 1 <BR> tag for words Chairman and CEO, a set of 1 <P> tag and 2 <BR> tags for words ABC and Corporation, and a set of 1 <P> tag and 4 <BR> tags for the words John and Doe. A bounding process is, for instance, but not limited to, the process where certain localized content groupings around said business data are identified based upon tag and keyword placements. In the example above, the tags <P> and the double <BR><BR> are, for example, identified as a boundaries around the keywords Chairman and CEO. This bounding process, for example, helps in associating the name Joe Smith with the title Chairman and CEO and helps facilitate the extraction of the correct and associated name later. The name 'John Doe' also for instance, similarly gets associated with the title President and later gets properly extracted in a name detection process. Any database of 150A . . . 150N could be used to deliver the proper keywords as well as the instruction set to identify the proper tags and boundaries. However, the instruction set to identify the proper tags and boundaries could also be part of the program.

The rating in concordance table 250 is beneficial to the step of analyzing 260 from which position in the file and up to which position in the file to do a gross extraction of the business data. Analysis 260 could also be referred to as a break-factor analysis. Important in the analysis 260 is to check the positions of the keywords and tags and identify local word groupings that denote a certain content association with each other. In the example of contact information, it associates the right name with the right title by identifying the boundaries between various names and titles. The analysis includes, but is not limited to, an analysis by identifying the proper keywords and tags starting from the front of a word grouping as well as an analysis by identifying the proper keywords and tags starting from the back of a word grouping. After such an analysis, a number of factors are identified and based on these factors the business data are then ready to be evaluated and extracted 270. In the analysis step 260 duplicated words are eliminated as well as words that are predefined as disqualifying words. The extraction process 270 includes, but is not restricted to, using data bases 150A . . . 150N to identify business data and/or applying inclusion and exclusion characteristics suitable and appropriate for extracting the required business data. The next step in the parsing 140 method is to normalize the extracted data to a standard format. Such normalization for the contact information example would be to have the names in the first name and last format, and to expand all the acronym'ed titles to their full forms etc. The normalization process, may for example, be used later to identify and eliminate duplicate business data. The next step in the parsing 140 method is to collect the identified, analyzed and selected business data and group them according to a particular format. Such a format could for instance be, in the example of a list of senior managers, a list that starts with the most senior people first and then going down the list of management seniority such as Chairman, President, CEO, COO, VP etc. Once a set of business data 160 has been compiled it is sometimes necessary to update or refresh the data to keep it current. Therefore the present invention also includes the step of updating 280 the database before it returns 290 back to the main program. Updating 280 is done by using time stamps or date stamps that compare to the last date of mining or the parsing of a particular file or link. Once the stamp on the accessed file is found to be newer/later than the stamp in the compiled data or in the business data database 160, the method is repeated to update the business data database 160 with the most current information. Date or time stamps are also evaluated for determining whether the business data in a file is in accordance to the business data that one is looking for. For instance, a press release has a date and time stamp that provides information on whether to proceed with parsing and extracting the business data from that file containing the press release.

It will be clear to one skilled in the art that the above embodiments may be altered in many ways without departing from the scope of the invention. For example, while corporate websites are preferred for obtaining current information, the invention can be extended to extract information from third party websites, such as press release wire services, professional/trade associations or magazine/newspaper websites. This information can be used to augment the contact database if a corporate website does not exist or does not contain a management page. Potential sources may sometimes need to be accessed manually first to learn how access to the contact information is obtained. Typically, business data are either directly accessible by following hyperlinks, or behind a CGI script, accessible only by entering a search string into a text bar or clicking a search button. For hyperlink accessible data, a general purpose search engine such as Google may be used. For data behind CGI scripts, an automated spider must be tailored to each particular website, because contact information is accessed differently from each web site. For example, sources of contact information that can be accessed by a hyperlink are useful. Conversely, Bizjournal.com provides a full-text searchable archive of numerous local business newspapers. Both types of sites (hyperlink and script) may be accessed using an automated spider.

In addition, those skilled in the art will appreciate that the method and apparatus of the present invention, as well as the product resulting from this, is capable of being distributed in the form of a computer readable medium of instructions in a variety of forms. The present invention applies equally regardless of the particular type of signal bearing medium used to actually carry out the distribution. Examples of computer readable medium include: recordable type media such as floppy disks and CD-ROMS and transmission type media such as digital and analog communication links. In addition, the present invention could be implemented and coded in different programming languages such as, but not limited to, for example C and $C^{++}$ programming languages, JAVA or Java script, or DHTML.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A computer-implemented method of compiling identity and contact information of senior managers in a distributed computer system, comprising the steps of:
 a) compiling in a distributed computer system multiple, unrelated, structurally different information sources other than structured databases, wherein each information source is characterized as coded in a markup language file and wherein each of said markup language files contains a unique set of information compared to the other compiled markup language files;
 b) identifying and obtaining from said compiled markup language files senior management information; wherein
  said senior management information includes at least one senior management title, names respectively associated to said title, and contact information respectively associated to said names, and wherein
  said contact information is selected from the group consisting of email addresses, phone numbers, fax numbers, postal addresses, and a combination thereof;
 c) parsing through each of said markup language files to extract said senior management titles; and
 performing the following computer-implemented steps for each title extracted:
 d) determining in said markup language file a local content grouping near and associated with a particular title;
 e) identifying and extracting from said markup language file a name associated with said title from only said local content grouping;
 f) evaluating from said markup language file a current and historic relationship between said name and said title; and
 g) selecting the most current said title and said associated name based on said evaluated current and historic relationship;
 h) displaying said selected the most current said title and said associated name to a user.

2. The method as set forth in claim 1, wherein each of said files having a corresponding uniform resource locator address (URL), further comprising the steps of:
 scoring a confidence level of said name and said title;
 determining which of said files having the highest score of said confidence level; and
 recording the URL of the file with the highest score.

3. The method as set forth in claim 1, further comprising the step of:
 evaluating each of said files to determine a corresponding confidence level of finding said senior management information and quantity thereof.

4. The method as set forth in claim 1, further comprising the step of:
 evaluating each of said files to determine a corresponding confidence level of finding a set of keywords therein, said keywords identifying said senior management information.

5. The method as set forth in claim 1, further comprising the step of locating said files on corporate websites.

6. The method as set forth in claim 1, further comprising the step of locating said files on magazine websites.

7. The method as set forth in claim 1, further comprising the step of locating said files on newspaper websites.

8. The method as set forth in claim 1, further comprising the step of locating said files on press release websites.

9. The method as set forth in claim 1, further comprising the step of locating said files on professional websites.

10. The method as set forth in claim 1, further comprising the step of locating said files on association websites.

11. The method as set forth in claim 1, further comprising the step of locating said files using a publicly accessible search engine.

12. The method as set forth in claim 1, further comprising the step of locating said files using a custom designed spider.

13. The method as set forth in claim 1, wherein said files contain semi-structured information.

14. The method as set forth in claim 1, wherein said files Contain structured information.

15. The method as set forth in claim 1, further comprising the step of locating said files using a previously generated list of said files.

16. The method as set forth in claim 1, further comprising the step of locating said files using one or more tags.

17. The method as set forth in claim 1, further comprising the step of extracting said senior management information using one or more tags.

18. The method as set forth in claim 1, further comprising the step of creating a concordance table for associating one or more tags and keywords related to said senior management information with a rating system so that said senior management information is rated and bounded.

19. The method as set forth in claim 18, further comprising the steps of:
identifying boundaries around said keywords; and
bounding said local content grouping based on said boundaries.

20. The method as set forth in claim 1, further comprising the step of extracting said name using inclusion and exclusion characteristics.

21. The method as set forth in claim 1, further comprising the step of normalizing names and titles extracted from said files to a standard format.

22. The method as set forth in claim 1, further comprising the step of eliminating duplicate sets of names and titles extracted from said files.

23. The method as set forth in claim 1, further comprising the step of extracting date or time stamps of said files.

24. The method as set forth in claim 23, further comprising the step of evaluating said date or time stamps of said files.

25. The method as set forth in claim 23, further comprising the step of evaluating said date or time stamps with date or time stamps of previously extracted files.

26. The method as set forth in claim 23, further comprising the step of updating said name and said title using said date or time stamps.

27. A computer system of compiling identity and contact information of senior managers in a distributed computer system, comprising:
a processor, wherein said processor is programmed to:
a) compiling in said distributed computer system multiple, unrelated, structurally different information sources other than structured databases, wherein each information source is characterized as coded in a markup language file and wherein each of said markup language files contains a unique set of information compared to the other compiled markup language files;

b) identifying and obtaining from said compiled markup language files senior management information; wherein
said senior management information includes at least one senior management title, names respectively associated to said title, and contact information respectively associated to said names, and wherein
said contact information is selected from the group consisting of email addresses, phone numbers, fax numbers, postal addresses, and a combination thereof;

c) parsing through each of said markup language files to extract said senior management titles; and
performing the following computer-implemented steps for each title extracted:

d) determining in said markup language file a local content grouping near and associated with a particular title;

e) identifying and extracting from said markup language file a name associated with said title from only said local content grouping;

f) evaluating from said markup language file a current and historic relationship between said name and said title; and g) selecting the most current said title and said associated name based on said evaluated current and historic relationship;

h) displaying said selected the most current said title and said associated name to a user.

28. A system of compiling identity and contact information of senior managers, comprising:
a compiling means to compile multiple, unrelated, structurally different information sources other than structured databases, wherein each information source is characterized as coded in a markup language file and wherein each of said markup language files contains a unique representation of information relative to the other markup language files;
an identifying means for identifying and obtaining from said compiled markup language files senior management information;
an integrity evaluation means for determining whether said markup language files are available and contain senior management information; wherein
said senior management information includes at least one senior management title, names respectively associated to said title, and contact information respectively associated to said names, and wherein
said contact information is selected from the group consisting of email addresses, phone numbers, fax numbers, postal addresses, and a combination thereof;
a parsing means for extracting from said markup language files said senior management titles and names associated therewith;
a evaluation means for determining from said markup language files a current and historic relationship of said titles and said names associated therewith, respectively; and
a selection means for selecting the most current said title and said associated name based on said determined current and historic relationship;
a displaying means for displaying said selected the most current said title and said associated name to a user.

29. A computer-readable medium carrying computer-executable instructions, which when executed by a computer, causing said computer to implement the method steps of:
- a) compiling in a distributed computer system multiple, unrelated, structurally different information sources other than structured databases, wherein each information source is characterized as coded in a markup language file and wherein each of said markup language files contains a unique set of information compared to the other compiled markup language files:
- b) identifying and obtaining from said compiled markup language files senior management information; wherein
  said senior management information includes at least one senior management title, names respectively associated to said title and contact information respectively associated to said names, and wherein
  said contact information is selected from the group consisting of email addresses, phone numbers, fax numbers, postal addresses, and a combination thereof;
- c) parsing through each of said markup files to extract said senior management titles; and performing the following computer-implemented steps for each title extracted:
- d) determining in said markup language file a local content grouping near and associated with a particular title;
- e) identifying and extracting from said markup language file a name associated with said title from only said local content grouping;
- f) evaluating from said markup language file a current and historic relationship between said name and said title; and
- g) selecting the most current said title and said associated name based on said evaluated current and historic relationship;
- h) displaying said selected the most current said title and said associated name to a user.

* * * * *